Oct. 15, 1968

C. J. PETERS 3,406,356

OPTICAL FREQUENCY TRANSLATOR

Filed Dec. 21, 1964

INVENTOR
CHARLES J. PETERS

BY

*Spencer E. Olson*

ATTORNEY

INVENTOR
CHARLES J. PETERS

United States Patent Office 3,406,356
Patented Oct. 15, 1968

3,406,356
OPTICAL FREQUENCY TRANSLATOR
Charles J. Peters, Wayland, Mass., assignor to Sylvania Electric Products Inc., a corporation of Delaware
Filed Dec. 21, 1964, Ser. No. 419,909
3 Claims. (Cl. 332—7.51)

ABSTRACT OF THE DISCLOSURE

A pair of electro-optical phase modulators are energized with quadrature phased signals to produce an array of sideband signals each having a unique polarization. A polarizer arranged in light transmitting arrangement with the modulators selects the desired sideband signal and suppresses the carrier and other sidebands.

---

This invention relates to electro-optical devices and more particularly to electro-optical devices operative to generate an array of sideband signals displaced in frequency from a carrier signal.

In light communication systems, as in electronic communication systems, it is often desirable to shift a signal to a different frequency. For example, in an optical heterodyne receiver, a local oscillator signal must be provided at a frequency offset from the received signal by a certain amount. This local oscillator signal can be generated by a frequency translator which shifts a signal, typically from a laser, to the desired frequency.

It is a primary object of the invention to provide an electro-optical frequency translator.

Another object of the invention is to provide an electro-optical device which generates an array of sidebands.

A further object of the invention is to provide an electro-optical frequency translator using modulator techniques and operable over a wide bandwidth.

Briefly, the invention comprises a pair of electro-optical phase modulators, energized with quadrature phased signals to produce an array of sideband signals each having a unique polarization. The desired sideband is selected, and the carrier and other sidebands suppressed, by a polarizer oriented to pass only the light component having the desired polarization.

The foregoing, together with other objects, features and advantages of the invention will be more fully understood from the following detailed description, taken in conjunction with the accompanying drawings, in which.

When an energizing signal is applied along the [001] axis of a birefringent crystal, the index of refraction along the [110] axis varies in accordance with the applied modulating signal. The index of refraction along the [001] axis does not vary significantly. Thus, phase modulation is imparted to the electric field component of incident light along the [110] axis. It has been found that two such phase modulators may be employed to generate an array of sideband signals. A particular sideband signal can be filtered out to obtain a signal which is offset in frequency from the carrier signal by a desired amount.

Figure 1:
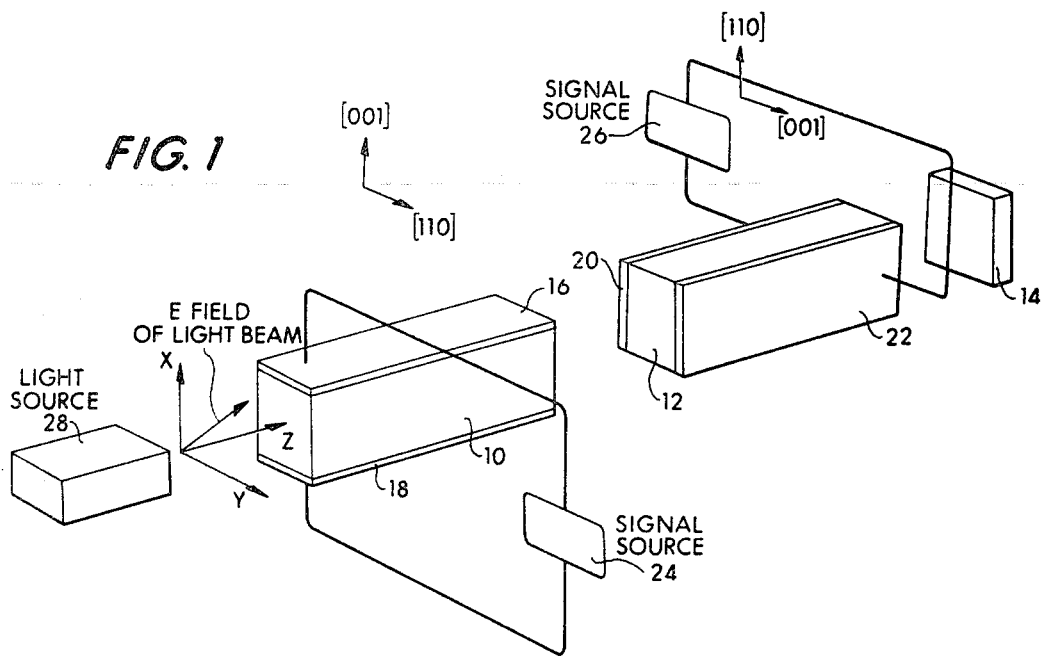
FIG. 1 is a diagrammatic pictorial view of one embodiment of the presentt invention.

Referring to FIG. 1, there is shown a diagrammatic embodiment of the invention which comprises a first phase modulator including a birefringent electro-optic crystal 10, a second phase modulator including a birefringent electro-optic crystal 12 disposed with its optical axes orthogonal to the axes of crystal 10, and a polarizer 14. Crystal 10 and crystal 12 each have a pair of parallel plate electrodes, 16 and 18, and 20 and 22, respectively, disposed on respective opposite faces to provide an electric field along the [001] axis. Electrodes 16 and 18 are energized from a modulation signal source 24 which is 90° out of phase with respect to signal source 26 which energizes electrodes 20 and 22. An incident light beam, disposed with its electric vector intermediate the crystal axes, for example at 45° thereto, is transmitted through the crystals from a suitable light source 28, such as a laser.

For ease of explanation, the invention will be described in conjunction with the coordinate axes X, Y, and Z, which are not associated with the crystal axes. In operation, the component of incident light along the Y axis is phase modulated via energizing signal source 24 and electrodes 16 and 18, due to the characteristics of crystal 10. The component of light along the X axis is not affected by the modulating potential from source 24 since it is parallel to the optic axis of crystal 10. The component of light parallel to the X axis is phase modulated in crystal 12 via signal source 26 and electrodes 20 and 22, while the component along the Y axis is not modulated. By modulating these two components in phase quadrature with respect to each other, an array of sideband signals is produced about the carrier frequency. Each composite signal has a unique phase relationship between its components. Thus, each sideband signal has a unique polarization. A particular sideband signal can be selected by passing the modulated light through a polarizing element 14 oriented to pass only the light component having the desired polarization.

The operation of the frequency translator can be demonstrated mathematically as follows. The component of incident light, $E_x$, parallel to the X axis receives a phase modulation which can be expressed as $$E_x = \cos[\omega t + \phi_x + u \cos pt] \quad \text{Eq. 1}$$

where $\omega$ is the angular frequency of the light,
$\phi_x$ is the quiescent phase shift imparted to the component of light along the X axis,
$p$ is the modulation angular frequency,
$u$ is the modulation index.

The second phase modulator imparts a phase modulation to the component of incident light which is parallel to the Y axis, the modulation potential being 90° out of phase with respect to the modulation applied to the first modulator, and can be expressed as $$E_y = \cos[\omega t + \phi_y + u \sin pt] \quad \text{Eq. 2}$$

where $\phi_y$ is the quiescent phase shift imparted to the component of light along the Y axis.

As is well known, the modulation equations, Eq. 1 and Eq. 2, can be expanded in a series of Bessel functions to describe the sideband structure of the two waves. The resultant of the horizonal and vertical components can be expressed most easily using the notation of the Jones calculus, described, for example, in "Polarized Light" by W. A. Shurcliff, Harvard University Press, 1962. This expansion yields $$E = \begin{bmatrix} 1 \\ 1 \end{bmatrix} J_0(\mu) e^{j\omega t}$$

$$+ \begin{bmatrix} +j \\ 1 \end{bmatrix} J_1(\mu) e^{j(\omega+p)t}$$

$$+ \begin{bmatrix} +j \\ -1 \end{bmatrix} J_1(\mu) e^{j(\omega-p)t}$$

$$- \begin{bmatrix} 1 \\ -1 \end{bmatrix} J_2(\mu) e^{j(\omega+2p)t}$$

$$- \begin{bmatrix} 1 \\ -1 \end{bmatrix} J_2(\mu) e^{j(\omega-2p)t}$$

$$+ \begin{bmatrix} -j \\ 1 \end{bmatrix} J_3(\mu) e^{j(\omega+3p)t}$$

$$- \begin{bmatrix} +j \\ 1 \end{bmatrix} J_3(\mu) e^{j(\omega-3p)t}$$

Eq. 3

Each term of Eq. 3 describes the polarization state of the respective components in the sideband spectrum. It will be noted that each sideband component has a unique polarization, which can be selected by means of a suitably oriented polarizer. In the above equation, the carrier is linearly polarized parallel to the polarization of the incident light. The first pair of sidebands are oppositely circularly polarized. The second pair of sidebands are linearly polarized orthogonal to the carrier, and the third pair of sidebands are circularly polarized. The second pair of sidebands are linearly polarized orthogonal to the carrier, and the third pair of sidebands are circularly polarized, the upper third sideband being of the same sense as the lower first sideband.

A circular polarizer can be used to select a given sideband and suppress the carrier and other sidebands. The operation of the circular polarizer can be computed using the Jones calculus. Consider the circular polarizer to be composed of a quarter wave retardation plate with a vertical fast axis, and a linear polarizer with its transmission axis at 45°. This combination of optical elements can be represented by the matrix $$\tfrac{1}{2} e^{-j\tfrac{\pi}{4}} \begin{bmatrix} 1 & j \\ 1 & j \end{bmatrix}$$

Eq. 4

If the matrix of Eq. 4 is multiplied by the matrix expression of each sideband component (Eq. 3), the relative sideband magnitudes are obtained, as follows:

| Frequency component: | Relative optical power |
|---|---|
| Carrier | $\tfrac{1}{2} J_0^2(\mu)/J_1^2(\mu)$ |
| First lower sideband | 1 |
| First upper sideband | 0 |
| Second lower sideband | $\tfrac{1}{2} J_2^2(\mu)/J_1^2(\mu)$ |
| Second upper sideband | $\tfrac{1}{2} J_2^2(\mu)/J_1^2(\mu)$ |
| Third lower sideband | 0 |
| Third upper sideband | $J_3^2(\mu)/J_1^2(\mu)$ |

For the particular orientation of the polarizer, the first lower sideband is the desired one, while all others are suppressed to varying degrees. The degree of suppression of the unwanted sidebands depends upon the modulation index of the crystals. It has been found that a modulation index between 1.6 and 2 provides optimum suppression. At a modulation index of 1.8, maximum power conversion between input and output signals is obtained with an efficiency of approximately 33%.

Figure 2:
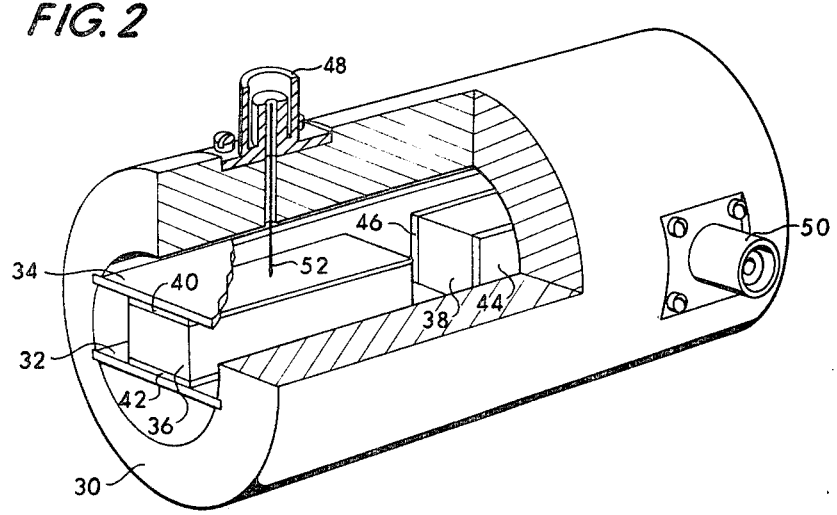
FIG. 2 is a pictorial view, partly broken away, of an operative embodiment of the invention.

In practice, the frequency translator is housed in a coaxial structure of the type illustrated in FIG. 2, which is designed to provide thermal symmetry to prevent thermal gradients along the length of the device which alter the operating point thereof, and to prevent thermal gradients across the width of the crystals which cause beam deflection. The housing includes a thick-walled conductive cylinder 30, typically aluminum, and insulating support plates 32 and 34 mounted in spaced apart relationship within the opening thereof to support crystals 36 and 38. Crystal 36 has a pair of electrodes 40 and 42 for applying the modulating potential, while crystal 38 has a similar pair of electrodes 44 and 46. Connection to the respective electrode pairs is made via coaxial connectors 48 and 50. The center conductor of each connector is connected to the nearest electrode, such as center conductor 52 connected to electrode 40, while the outer conductor is connected directly to outer cylinder 30, making connection to the second electrode of each electrode pair by means of a connection between these electrodes and cylinder 30. The polarizer (not shown) is mounted at the output end of the cylinder, or alternatively, can be mounted external thereto. This construction affords a rugged and thermally stable housing for the frequency translator. Since the structure is thermally symmetrical, both along the length of the crystals and across the width thereof, thermal gradients are prevented which would disturb proper device operation. In a frequency translator constructed according to the invention, crystals 36 and 38 each are .1 x .1 x 2 inches, and are housed in cylinder 30 which is 2 inches in diameter and 6 inches long. Thermal gradients along the length of the device are maintained within .3° C. by the thermally massive cylinder 30 to provide optimum performance. A drive voltage of approximately 900 volts was employed for a modulation index of 1.8.

Figure 3:
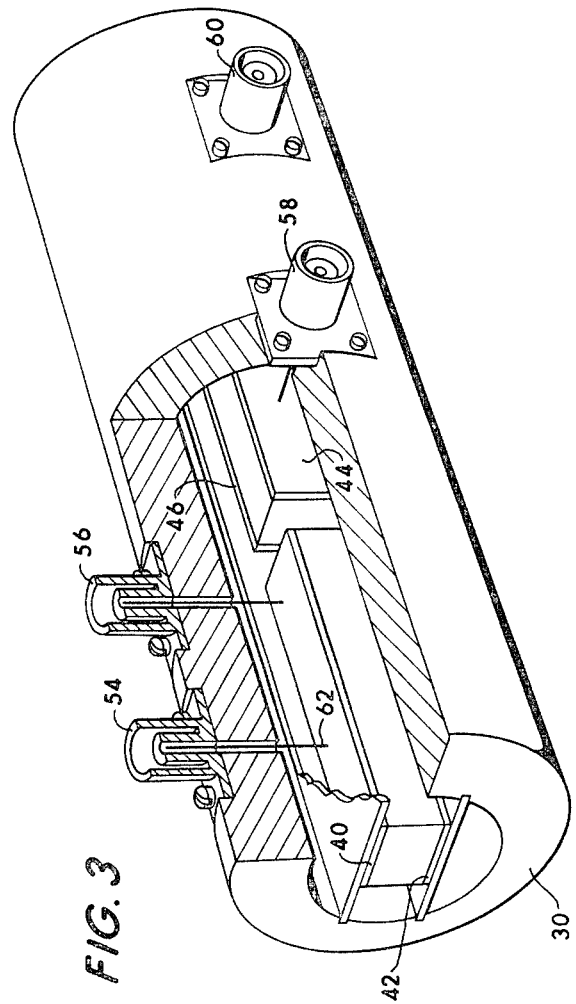
FIG. 3 is a pictorial view, partly broken away of another embodiment of the invention.

To provide wideband operation, the phase modulators employed in the present invention can be of the traveling wave type described in Patent No. 3,313,938, issued Apr. 11, 1967, and assigned to the same assignee as the present application. Briefly, this type of modulator employs a suitably oriented birefringent crystal which is energized by a traveling wave structure, such as parallel plate transmission line. The modulator is designed so that the velocity of propagation of the light through the crystal is substantially equal to the propagation velocity of the modulating signal through the crystal, resulting in a device that is operable over a wide band of frequencies. This type of modulator is illustrated in the embodiment of FIG. 3 which is similar to the above-described embodiment except that the electrodes are employed as a traveling wave structure to propagate a modulating signal through the active crystals. Referring to FIG. 3, it is seen that the electrodes at each phase modulator are connected at opposite ends to respective coaxial connectors. Electrodes 40 and 42 are connected to coaxial connectors 54 and 56, with the center conductor of each connector being connected to respective ends of electrode 40, while the outer conductor of each connector is connected to cylinder 30, connection being made to electrode 42 via a connection from respective ends of electrode 42 to cylinder 30, only one connection 62 being shown. Connection from electrodes 44 and 46 to coaxial connectors 58 and 60 is made similarly. In operation, a first modulating signal from a suitable source, such as source 24 of FIG. 1, is applied to coaxial connector 54 and a load (not shown) is connected to coaxial connector 56. Similarly, a second modulating signal in phase quadrature with the first signal, for example from source 26 of FIG. 1, is applied to coaxial connector 58 and a load connected to connector 60. The electrodes and associated crystals function as a traveling wave structure to propagate the modulating signals along respective phase modulators to provide wideband operation in accordance with the teaching of the above-identified copending application.

Rather than physically disposing the crystals with their optic axes relatively orthogonal they can be disposed with their optic axes collinear and the proper relative orientation provided by means of a half wave plate or 90° rotator located between the crystals, as discussed in the above-identified copending application. This construction is mechanically advantageous as the electrodes would be in a common plane.

From the foregoing, it is evident that an electro-optic device has been provided which is capable of generating an array of sideband signals displaced in frequency from the incident light frequency, and which is operable over a wide bandwidth. The invention is not to be limited by what has been particularly shown and described, as various modifications and alternative implementations will occur to those versed in the art without departing from the true spirit and scope of the invention. The invention is to be limited only as indicated in the appended claims.

What is claimed is:

1. In an electro-optical frequency translating system which includes a light source operative to transmit a light beam oriented with its electric vector in a predetermined position, a frequency translator comprising, first and second electro-optical phase modulators collinearly arranged in light transmitting relationship and each disposed with its optical axes effectively orthogonal to the optical axes of the other, said optical axes also being so oriented with respect to said electric vector that said vector is intermediate said optical axes, means connected to said first modulator and operative to apply a first modulating potential thereto, means connected to said second modulator and operative to apply a second modulating potential thereto which is in phase quadrature with respect to said first modulating potential, and a polarizer arranged in light transmitting relationship with said modulators and said light source and operative to select a particular component of said light beam.

2. In an electro-optical frequency translating system which includes a light source operative to transmit a light beam oriented with its electric vector in a predetermined position, a frequency translator comprising, a first electro-optic crystal having a first pair of electrodes disposed on opposite faces thereof, a first modulation source connected to said first pair of electrodes and operative to apply a modulating potential along one of the optical axes of said first crystal, a second electro-optic crystal having a second pair of electrodes disposed on opposite faces thereof, said second crystal being oriented with its optical axes orthogonal to the optical axes of said first crystal, a second modulation source connected to said second pair of electrodes and operative to apply a modulating potential along one optical axis of said second crystal which potential is in phase quadrature with the modulating potential applied to said first crystal, said crystals being disposed in collinear light transmitting relationship with the optical axes so oriented that said electric vector is disposed intermediate said optical axes, and a polarizer disposed in collinear light transmitting relationship with said crystals and light source and operative to select a component of said light beam.

3. In an electro-optical frequency translating system which includes a light source operative to transmit a light beam oriented with its electric vector in a predetermined position a frequency translator comprising, a first electro-optic crystal having a first pair of electrodes disposed on opposite faces thereof, a first modulation source connected to said first pair of electrodes and operative to apply a modulating potential along the [001] axis of said first crystal, a second electro-optic crystal having a second pair of electrodes disposed on opposite faces thereof, said second crystal being oriented with its optical axes orthogonal to the optical axes of said first crystal, a second modulation source connected to said second pair of electrodes and operative to apply a modulating potential along the [001] axis of said second crystal which potential is in phase quadrature with the modulating potential applied to said first crystal, said crystals being disposed in collinear light transmitting relationship with the optical axes so oriented that said electric vector is disposed intermediate said optical axes, and a polarizer disposed in collinear light transmitting relationship with said crystals and light source and operative to select a component of said light beam.

References Cited

UNITED STATES PATENTS

| | | | |
|---|---|---|---|
| 3,239,671 | 3/1966 | Buhrer | 250—199 |
| 3,304,428 | 2/1967 | Peters | 332—7.51 |
| 3,313,938 | 4/1967 | Peters | 332—7.51 |

OTHER REFERENCES

Peters, "Proc. IEEE," January 1963, pp. 147–153.
Peters, "Proc. IEEE," May 1965, pp. 455–460.
Buhrer, "Proc. IEEE," August 1964, pp. 969–970.

ROY LAKE, *Primary Examiner.*

DARWIN R. HOSTETTER, *Assistant Examiner.*